(12) United States Patent
Boben et al.

(10) Patent No.: US 11,822,129 B1
(45) Date of Patent: *Nov. 21, 2023

(54) METHOD FOR MAKING A LOW-LOSS FIBER OPTIC CONNECTOR

(71) Applicant: CORNING RESEARCH & DEVELOPMENT CORPORATION, Corning, NY (US)

(72) Inventors: Raisa Rose Boben, Hickory, NC (US); Woraphat Dockchoorung, Corning, NY (US); Riley Saunders Freeland, Corning, NY (US); Klaus Hartkorn, Painted Post, NY (US); Mark Alan McDermott, Prattsburgh, NY (US); Aislin Karina Sullivan, Mission, TX (US); Pushkar Tandon, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,697

(22) Filed: Oct. 10, 2022

Related U.S. Application Data

(63) Continuation of application No. 17/097,185, filed on Nov. 13, 2020, now Pat. No. 11,467,350.

(Continued)

(51) Int. Cl.
 *G02B 6/36* (2006.01)
 *G02B 6/38* (2006.01)

(52) U.S. Cl.
 CPC ......... *G02B 6/3843* (2013.01); *G02B 6/3871* (2013.01); *G02B 6/3885* (2013.01); *G02B 6/3889* (2013.01); *G02B 6/3893* (2013.01)

(58) Field of Classification Search
 CPC .. G02B 6/3843; G02B 6/3885; G02B 6/3889; G02B 6/3871; G02B 6/3893; G02B 6/36
 See application file for complete search history.

(56) References Cited

U.S. PATENT DOCUMENTS

| 6,742,936 B1 | 6/2004 | Knecht et al. |
| 8,104,974 B1 | 1/2012 | Gurreri |

(Continued)

FOREIGN PATENT DOCUMENTS

| JP | 05-088045 A | 4/1993 |
| WO | 2015/068122 A1 | 5/2015 |

OTHER PUBLICATIONS

European Patent Application No. 20207823.4 Extended European Search Report dated Mar. 31, 2021; 9 pages; European Patent Office.

(Continued)

*Primary Examiner* — Jennifer Doan

(57) ABSTRACT

A method of terminating an optical fiber having an inner core with a fiber optic connector including a ferrule having a micro-bore and an end face with a mating location is disclosed. The method includes determining a bore bearing angle of a bore offset of the micro-bore in the ferrule; determining a core bearing angle of a core offset of the inner core in the optical fiber; orienting the ferrule and the optical fiber relative to each other to minimize the distance between the inner core and the mating location; heating the ferrule to an processing temperature above room temperature; and coupling the optical fiber to the micro-bore of the ferrule. The size of the micro-bores and optical fibers may be selected to maximize the number of interference fits in a population of ferrules and optical fibers while minimizing failed fittings between the ferrules and optical fibers in the populations.

25 Claims, 10 Drawing Sheets

Related U.S. Application Data

(60) Provisional application No. 62/941,990, filed on Nov. 29, 2019.

(56) References Cited

U.S. PATENT DOCUMENTS

| | | |
|---|---|---|
| 8,696,215 B1 | 4/2014 | Fewkes et al. |
| 9,568,686 B2 | 2/2017 | Fewkes et al. |
| 9,891,390 B2 | 2/2018 | Wang |
| 10,185,096 B2 | 1/2019 | Clarke et al. |
| 10,488,600 B2 | 11/2019 | Lock et al. |
| 11,280,967 B2 * | 3/2022 | Boben .................. G02B 6/3893 |
| 11,467,350 B2 * | 10/2022 | Boben .................. G02B 6/3889 |
| 2013/0343709 A1 | 12/2013 | Danley et al. |
| 2014/0064665 A1 | 3/2014 | Ott et al. |
| 2014/0133794 A1 * | 5/2014 | Kono ...................... G02F 1/225 |
| | | 385/2 |
| 2020/0073067 A1 | 3/2020 | Lohse et al. |

OTHER PUBLICATIONS

European Patent Application No. 20207823.4 Search Report and Search Opinion dated Mar. 31, 2021; 2 Pages; European Patent Office.

R. Schultz, "Rapid Field Termination of an SMA Fiber Optic Connector", Proceedings of the Optical Fiber Conference, Los Angeles, Sep. 1982, pp. 165-170.

\* cited by examiner

METHOD FOR MAKING A LOW-LOSS FIBER OPTIC CONNECTOR

PRIORITY APPLICATION

This application is a continuation of U.S. application Ser. No. 17/097,185, filed on Nov. 13, 2020, which claims the benefit of priority to U.S. Application No. 62/941,990, filed on Nov. 29, 2019, both applications being incorporated herein by reference.

TECHNICAL FIELD

This disclosure relates generally to optical connectivity, and more particularly, to a method for making a low-loss fiber optic connector wherein the insertion loss between mated fiber optic connectors at an optical connection is reduced by minimizing the core-to-ferrule offset of each connector.

BACKGROUND

Optical fibers are useful in a wide variety of applications, including the telecommunications industry for voice, video, and data transmissions. Benefits of optical fiber include extremely wide bandwidth and low noise operation. In a telecommunications system that uses optical fibers, there are typically many locations where fiber optic cables carrying the optical fibers connect to equipment or other fiber optic cables. To conveniently provide these connections, fiber optic connectors are often provided on the ends of fiber optic cables to non-permanently connect and disconnect optical elements in the fiber optic network. The introduction of fiber optic connectors, however, may introduce insertion losses across an optical connection, i.e., at a junction between two or more optical fibers. One common optical connection in a network is that between two mated optical connectors, such as within an adapter. It should be recognized, however, that the term "optical connection" may encompass other types of junctions between optical fibers. The insertion losses in coupling two optical fibers across an optical connection are generally a function of the alignment of the optical fiber ends, the width of the gap between the ends, and the optical surface condition at the ends. The present disclosure primarily focuses on the first of these factors, i.e., reducing misalignments of the optical fibers across the optical connection.

FIGS. 1 and 2 illustrate an exemplary fiber optic connector 10 used in many modern fiber optic networks. Although the fiber optic connector 10 is shown in the form of a SC-type connector, the features may be applicable to different connector designs. This includes ST, LC, and MU-type connectors, for example, and other single-fiber or multi-fiber connector designs. As shown in these figures, the connector 10 includes a ferrule 12 having a ferrule bore 14 ("micro-bore") configured to support an optical fiber 16, a ferrule holder 18 from which the ferrule 12 extends, a housing 20 having a cavity 22 in which the ferrule 12 and ferrule holder 18 are received, and a connector body 24 configured to cooperate with the housing 20 to retain the ferrule 12 and ferrule holder 18 within the housing 20. More specifically, a back end of the ferrule 12 is received in a first portion of the ferrule holder 18 and is secured therein in a known manner (e.g., press-fit, adhesive, molding the ferrule holder 18 over the back end of the ferrule 12, etc.). The ferrule 12 and ferrule holder 18 may even be a monolithic structure in some embodiments. The ferrule holder 18 is biased to a forward position within the housing 20 by a spring 26, which extends over a second portion of the ferrule holder 18 that has a reduced cross-sectional diameter/width compared to the first portion. The spring 26 also interacts with internal geometry of the connector body 24, which may be secured to the housing 20 using a snap-fit or the like. For example, FIGS. 1 and 2 illustrate a rear portion of the housing 20 having cut-outs or slots on opposite sides so as to define a split shroud. The connector body 24 has tabs configured to be snapped into the slots and retained therein due to the geometries of the components.

When the connector 10 is assembled as shown in FIG. 1, a front end of the ferrule 12 projects beyond a front end of the housing 20. The ferrule end face presents the optical fiber 16 for optical coupling with a mating component (e.g., another fiber optic connector; not shown), such as an adapter. Thus, when the fiber optic connector 10 is mated with the other component, the optical fiber(s) in the ferrule can be held in alignment with the optical fiber(s) of the mating ferrule to establish an optical connection. At optical connections between fiber optic connectors, light exiting each optical fiber of a first fiber optic connector (of a first fiber optic cable) is introduced into a corresponding optical fiber within an adjacent, second fiber optic connector (of a second fiber optic cable). Bare optical fibers typically include an inner core through which the light is configured to travel, and an outer cladding configured to reflect the light back within the core and thereby minimize losses as the light is transmitted through the optical fiber. If contamination such as one or more pieces of debris is present on the end face of the ferrule of either of the fiber optic connectors that terminate the optical fibers, then transmission of optical signals from the inner core of the first optical fiber to the inner core of the second optical fiber optic may be inhibited. Furthermore, if optical fiber cores at an interconnection between first and second optical fibers are misaligned, then transmission of an optical signal from the inner core of the first optical fiber to the inner core of the second optical fiber may be inhibited, resulting in signal degradation at the interconnection. The inner cores must therefore be closely aligned to ensure long life and to minimize transmission loss and optical return loss at optical connection points.

There are several conventional approaches for achieving optical fiber alignment between two fiber optic connectors. For example, precision ceramic ferrules, V-grooves, three-rod containment, tuning ferrules, and precision bushing devices have been developed to aid in fiber alignment across an optical connection. While providing some improvement in fiber alignment, these approaches have a number of drawbacks. For example, these approaches may require premium raw materials (i.e., high cost) with tight tolerances that generally require complex processes that are not conducive to increased scale for mass production. Additionally, these approaches may be time consuming in field installation and/or require highly skilled labor, both of which increase the overall cost of the installation. One common and widely recognized approach for reducing insertion losses across an optical connection is connector tuning. This approach, however, can produce insertion losses that may exceed acceptable levels as optical fiber networks move toward higher data rates, higher transceiver speeds, and higher connection point densities along the network.

Thus, there is a need in the fiber optic industry for making fiber optic connectors that, when mated to another optical component, produce minimal insertion losses across the optical connection. More particularly, there is a need for a method that improves the alignment of the optical fibers;

particularly, the inner cores of the optical fibers, across the optical connection. There is a further need to provide this reduction in insertion losses without resorting to high-cost raw materials, extremely low-tolerance parts, complex manufacturing processes, and/or time-consuming installation processes. More particularly, it is desirable to achieve a reduction in insertion losses using current components, materials, and manufacturing techniques. In this way, improvements may be made at optical connections with a minimal impact on current production and overall costs.

SUMMARY

A method of terminating an optical fiber having an inner core with a fiber optic connector including a ferrule having a micro-bore and an end face with a mating location is disclosed. The method includes determining a bore bearing angle of a bore offset of the micro-bore in the ferrule at the end face relative to a reference axis of the ferrule; determining a core bearing angle of a core offset of the inner core in the optical fiber at an end of the optical fiber relative to a reference axis of the optical fiber; orienting the ferrule and the optical fiber relative to each other to minimize the distance between the inner core of the optical fiber and the mating location of the ferrule; heating the ferrule to an processing temperature above room temperature; and with the ferrule at the processing temperature and with the distance between the inner core and the mating location minimized, coupling the optical fiber to the micro-bore of the ferrule.

In one embodiment, orienting the ferrule and the optical fiber relative to each other to minimize the distance between the inner core and the mating location includes orienting the ferrule and the optical fiber relative to each other so that the bore bearing angle of the bore offset and the core bearing angle of the core offset are 180 degrees apart. To achieve this relationship between bearing angles, the method may further include marking the ferrule end face with an indicia along a radial line from a ferrule center of the ferrule through a bore center of the micro-bore, the indicia being positioned on the ferrule end face radially outboard of the micro-bore; and orienting the ferrule and the optical fiber relative to each other such that the radial line extends through a center of the inner core, and the indicia and the inner core are on opposite sides of a center of the optical fiber. In one embodiment, orienting the ferrule and the optical fiber relative to each other further includes fixing the orientation of the optical fiber and rotating the ferrule about a central axis of the ferrule. In an alternate embodiment, orienting the ferrule and the optical fiber relative to each other includes fixing the orientation of the ferrule and rotating the optical fiber about a central axis of the optical fiber. In still a further alterative embodiment, orienting the ferrule and the optical fiber relative to each other includes rotating the ferrule and the optical fiber about respective central axes of the ferrule and optical fiber. In one embodiment, the method further includes assembling the ferrule in the fiber optic connector prior to the orienting, heating, and coupling steps such that the rotation of the ferrule may be achieved by rotating the fiber optic connector.

In one embodiment, heating the ferrule further includes heating the ferrule to a processing temperature greater than 300° C., preferably greater than 350° C., and even more preferably greater than 400° C. Heating the ferrule to such a processing temperature expands the size of the micro-hole in the ferrule. In one embodiment, coupling the optical fiber to the micro-bore of the ferrule further includes disposing a bonding agent in the micro-bore of the ferrule; melting the bonding agent during the heating step; and when the bonding agent is melted, inserting the optical fiber in the micro-bore of the ferrule. The bonding agent may include a partially cross-linked polymer resin and a coupling agent that chemically bonds the partially cross-lined polymer resin to the optical fiber and the ferrule. The melting point of the bonding agent may be at least 250° C., and preferably at least 300° C.

A method of making a population of terminated optical fibers, each made according to the method described above includes selecting the mean diameter $\mu_1$ of the micro-bore of a population of ferrules and selecting the mean diameter $\mu_2$ of the optical fiber of a population of optical fibers such that the population of terminated optical fibers satisfies a pre-determined criterion. The pre-determined criterion is configured to increase the probability that the optical fibers form an interference fit with the ferrules without generating a significant number of pairings where the optical fiber does not fit within the micro-bore of the ferrules. In one embodiment, the pre-determined criterion is: $0 \leq D_2 - D_1 \leq 0.4$ μm for at least 25% of the population. In another embodiment, the pre-determined criterion is: $0 \leq D_2 - D_1 \leq 0.4$ μm for at least 50% of the population. In a further embodiment, the pre-determined criterion is: $0 \leq D_2 - D_1 \leq 0.4$ μm for at least 75% of the population. In yet a further embodiment, the pre-determined criterion is: $0 \leq D_2 - D_1 \leq 0.4$ μm for at least 90% of the population. The method may further include measuring an eccentricity of the micro-bore in each of the ferrules in the population; measuring an eccentricity of the inner core in each of the optical fibers in the population; separating the population of ferrules into a plurality of groups, each group having a different pre-determined range of eccentricities; separating the population of optical fibers into a plurality of groups, each group having a different pre-determined range of eccentricities, wherein the number of groups of ferrules and the number of groups of optical fibers is the same; ordering the groups of ferrules and groups of optical fibers by eccentricity; and performing the orienting, heating and securing steps using a selected ferrule and a selected optical fiber from corresponding groups of ferrules and optical fibers.

In another embodiment, a method of making a population of terminated optical fibers, each made according to the method described above includes selecting a population of ferrules; selecting a population of optical fibers; measuring a diameter of the micro-bore in each of the ferrules in the selected population; measuring a diameter of each of the optical fibers in the selected population; performing a statistical analysis of the diameters of the micro-bores in the ferrules to determine a mean diameter $\mu_1$ and a standard deviation $\sigma_1$ for the population of ferrules; performing a statistical analysis of the diameters of the optical fibers to determine a mean diameter $\mu_2$ and a standard deviation $\sigma_2$; and proceeding with the orienting, heating and coupling steps if one or more pre-determined criteria of the statistical data is met. In one embodiment, one or more pre-determined criteria of the statistical date may include: $0 \leq \mu_2 - \mu_1 \leq 0.4$ μm. In another embodiment, one or more pre-determined criteria of the statistical date may include:

$$0.75 \leq \frac{\sigma_2}{\sigma_1} \leq 2.5.$$

The method may further include measuring an eccentricity of the micro-bore in each of the ferrules in the population; measuring an eccentricity of the inner core in each of the optical fibers in the population; separating the population of ferrules into a plurality of groups, each group having a different pre-determined range of eccentricities; separating the population of optical fibers into a plurality of groups, each group having a different pre-determined range of eccentricities, wherein the number of groups of ferrules and the number of groups of optical fibers is the same; ordering the groups of ferrules and groups of optical fibers by eccentricity; and performing the orienting, heating and securing steps using a selected ferrule and a selected optical fiber from corresponding groups of ferrules and optical fibers.

In still a further embodiment, a method of making a population of terminated optical fibers based on the termination method described above is disclosed. The method further includes selecting a population of ferrules; selecting a population of optical fibers; measuring an eccentricity of the micro-bore in each of the ferrules in the population; measuring an eccentricity of the inner core in each of the optical fibers in the population; separating the population of ferrules into a plurality of groups, each group having a different pre-determined range of eccentricities; separating the population of optical fibers into a plurality of groups, each group having a different pre-determined range of eccentricities, wherein the number of groups of ferrules and the number of groups of optical fibers is the same; ordering the groups of ferrules and groups of fibers by eccentricity; and performing the orienting, heating and securing steps using a selected ferrule and a selected optical fiber from corresponding groups of ferrules and optical fibers. In an exemplary embodiment, the population of ferrules and the population of optical fibers may be separated into two or three groups for selective matching the ferrules and optical fibers.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. In general, the description relates to a method for improving the alignment of optical fibers across an optical connection by minimizing the offset between the inner core of the optical fiber and a fixed mating location on the ferrule of a fiber optic connector. The mating location is the area or portion of the ferrule end face that includes the end of the optical fiber and is configured to engage, confront or otherwise optically "connect" to an optical fiber in the other optical component (e.g., another fiber optic connector). The position of the mating location may depend on several factors, including the type of fiber optic connector. By minimizing the distance or offset (between the inner core of the optical fiber and a fixed mating location on the ferrule of the fiber optic connector), the position of the fiber core becomes more predictably located at or near the intended mating location of the fiber optic connector. Thus, when two fiber optic connectors are mated together such that the intended mating locations engage or confront each other and each of the fiber optic connectors have had the offset minimized, the insertion losses may be minimized since the respective inner cores of the optical fibers in the connectors are more likely to be aligned or more closely aligned than if the offsets were not minimized. The method in accordance with the present disclosure minimizes the offset between the fiber core and the mating location on the ferrule in a straightforward manner that avoids the high-cost approaches of the prior art. In this regard, the reduction in insertion losses across an optical connection in accordance with aspects of the present disclosure may be achieved with existing materials, parts, and with minimal changes to current manufacturing techniques. Thus, the resulting reduction in insertion losses across an optical connection may be achieved in a cost-effective manner.

Figure 1:
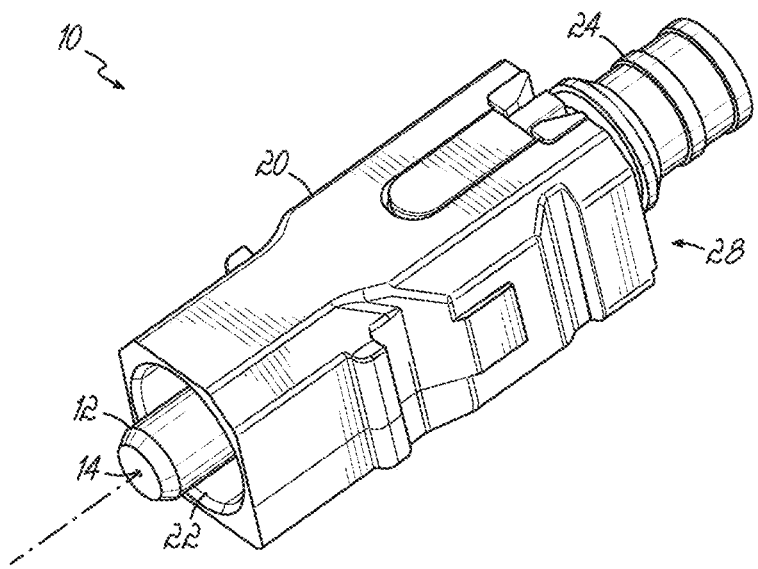
FIG. 1 is a perspective view of an exemplary fiber optic connector.
Figure 2:
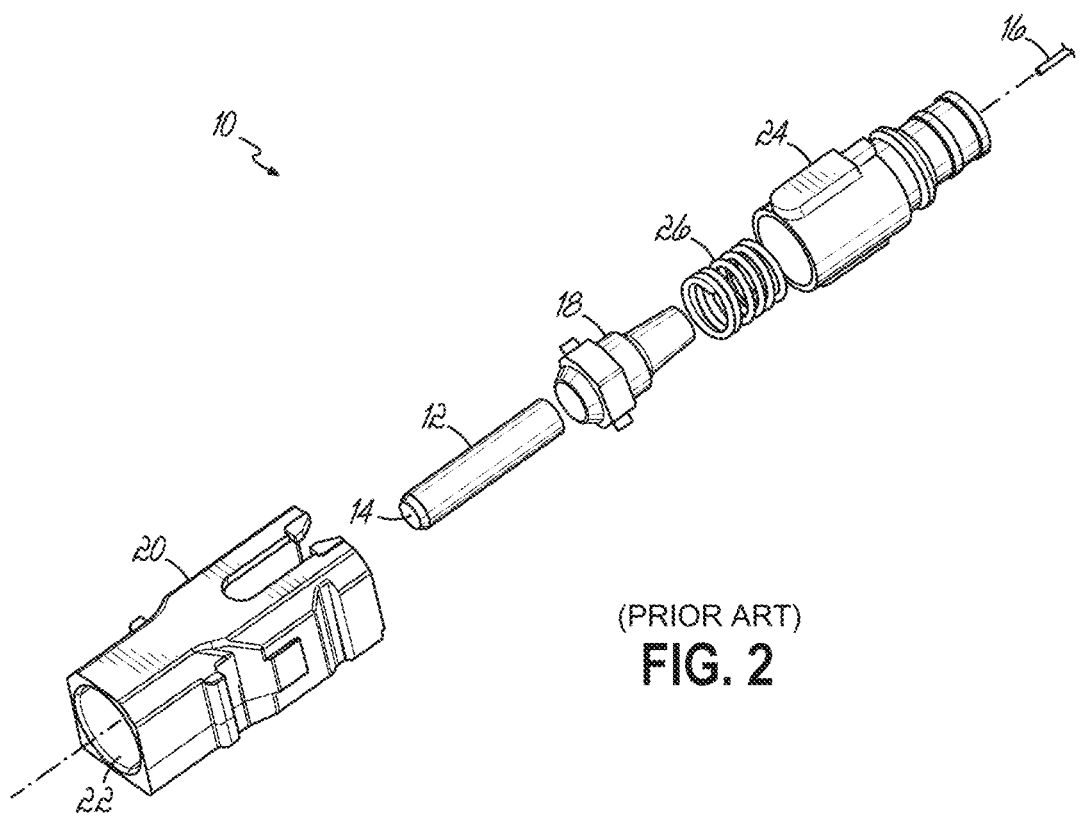
FIG. 2 is an exploded perspective view of the fiber optic connector shown in FIG. 1.
Figure 3:
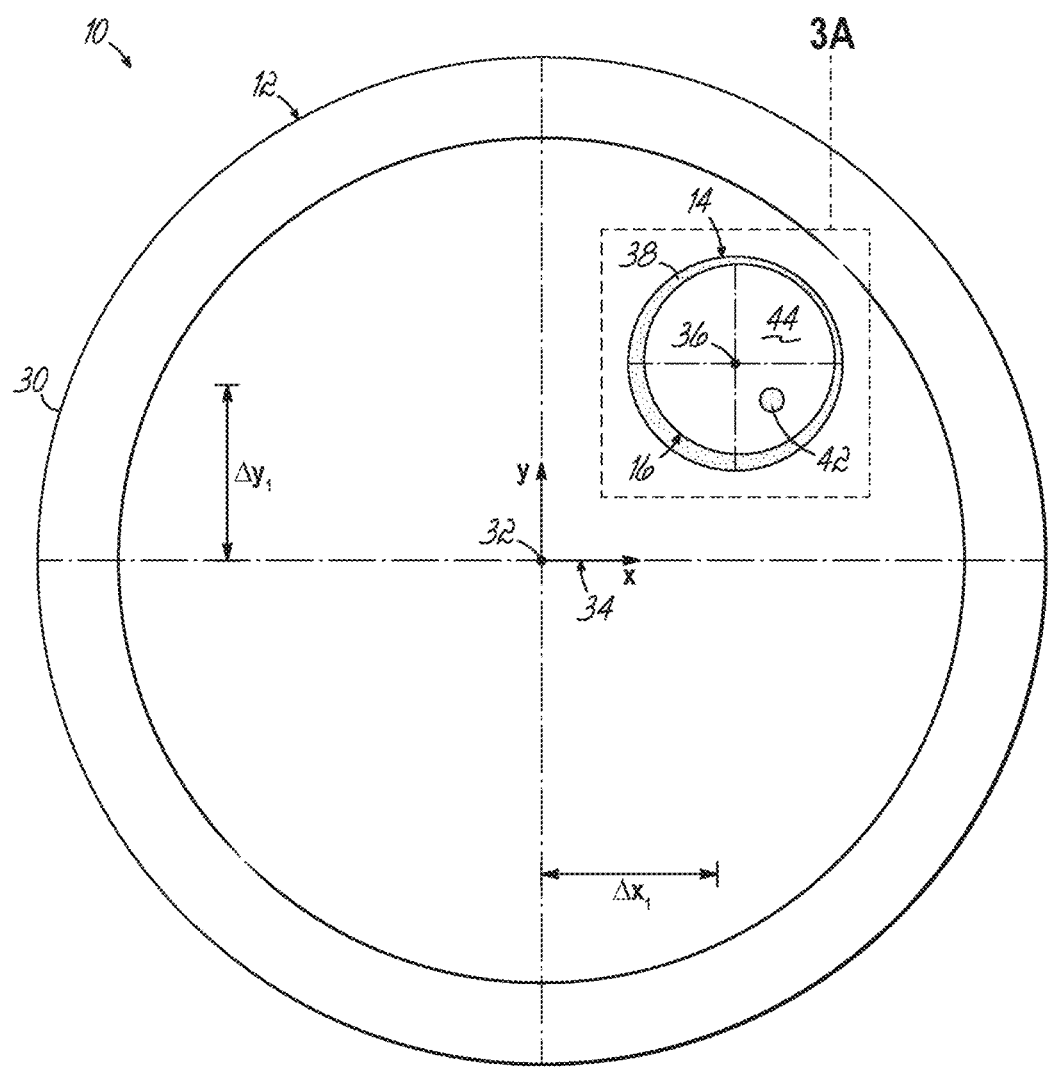
FIG. 3 is a schematic illustration of a typical end face of a ferrule of a fiber optic connector having an optical fiber positioned in a micro-bore of the ferrule.
Figure 3A:
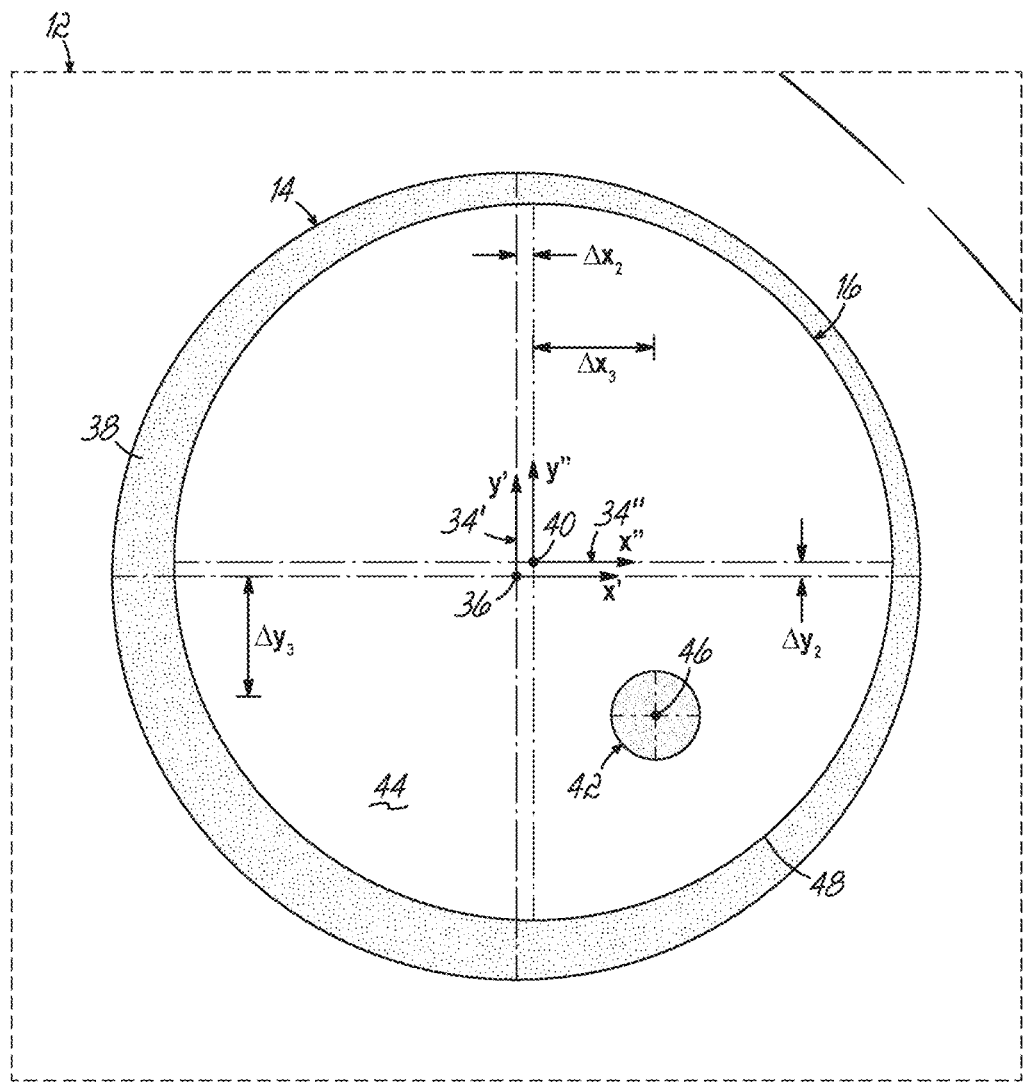
FIG. 3A is an enlarged schematic illustration of the area 3A shown in FIG. 3.

FIGS. 3 and 3A are schematic illustrations of an exemplary geometry at a tip of a fiber optic connector, such as fiber optic connector 10 illustrated in FIG. 1. The ferrule 12 includes an outer surface 30 that defines a center 32 (referred to as ferrule center 32). For purposes of discussion, a coordinate system 34 may be positioned at ferrule center 32 that defines orthogonal axes x and y (e.g., a Cartesian coordinate system). As explained above, the ferrule 12 includes a micro-bore 14 that is configured to receive the bare optical fiber 16. Ideally, the micro-bore 14 would be located such that the center 36 of the micro-bore 14 (referred to as bore center 36) coincides with the ferrule center 32. A coordinate system 34' may be positioned at bore center 36 that defines orthogonal axes x' and y'. Due to inherent tolerance variations in the materials and manufacturing processes, however, the micro-bore 14 is typically offset from the ferrule center 32 by some amount $\Delta x_1$, $\Delta y_1$. The optical fiber 16 is configured to be positioned in the micro-bore 14 and secured within the micro-bore 14 using a suitable adhesive or bonding agent 38. In current manufacturing methods, the micro-bore 14 is oversized relative to the optical fiber 16 such that the center 40 of the optical fiber 16 (referred to as fiber center 40) is typically offset from the bore center 36 by some amount $\Delta x_2$, $\Delta y_2$. Moreover, and as noted above, the optical fiber 16 includes an inner core 42 and an outer cladding 44. Ideally, the inner core 42 would be located such that the center 46 of the inner core 42 (referred to as core center 46) coincides with the fiber center 40. A coordinate system 34" may be positioned at fiber center 40 that defines orthogonal axes x" and y". Due to inherent tolerance variations in the materials and manufacturing processes, however, the core center 46 is typically offset from the fiber center 40 by some amount $\Delta x_3$, $\Delta y_3$.

As demonstrated above, the position of the inner core 42 of the optical fiber 16 relative to the mating location of the ferrule 12 may have a wide range of variance. That variation is influenced at least in part by: i) the position of the micro-bore 14 within the ferrule 12; ii) the position of the optical fiber 16 within the micro-bore 14; and iii) the position of the inner core 42 within the optical fiber 16. The challenge for reducing insertion losses is to locate the core center 46 as close as possible to the mating location on the ferrule 12 given the variations present in current materials and manufacturing techniques. In an exemplary embodiment, the ferrule center 32 may operate as the mating location of the ferrule 12, and the description below is premised on minimizing the offset between the center 46 of the inner core 42 and the center 32 of the ferrule 12. This offset is referred to as the core-to-ferrule offset and indicates the deviation in the position of the inner core 42 from its intended position (i.e., at the mating location). While the description below provides the mating location at the ferrule center 32, it should be recognized that aspects of the present disclosure also apply to embodiments where the mating location is not at the ferrule center 32 but at some other point on the ferrule 12 offset from the center 32. The goal would then be to minimize the offset between the core center 46 and the off-center mating location of the ferrule in that embodiment.

Figure 4:
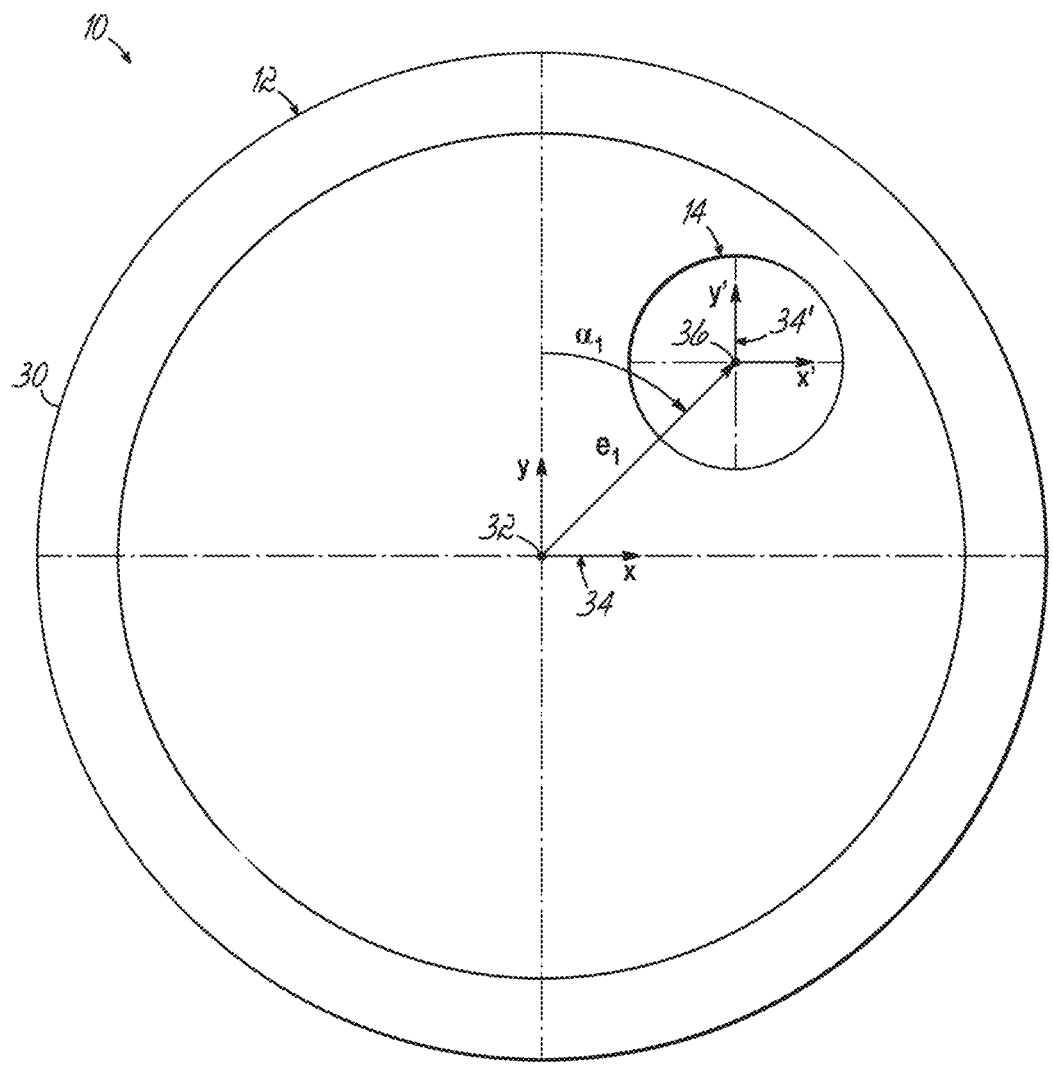
FIG. 4 is a schematic illustration of an end face of a ferrule of fiber optic connector showing a bore offset.

FIGS. 4-8 generally describe a method for minimizing the distance between the center 46 of the inner core 42 and the center 32 of the ferrule 12 (the core-to-ferrule offset) taking into account variations in the micro-bore 14 position within the ferrule 12 and variations in the inner core 42 position within the optical fiber 16 (i.e., numerals i) and iii) listed above). FIG. 4 is a schematic illustration of a ferrule 12 having an off-center micro-bore 14. The ferrule 12 includes an outer surface 30 that defines the center 32 of the ferrule 12. The coordinate system 34 is shown having its origin at the center 32 of the ferrule 12. The position of the center 36 of the micro-bore 14 relative to the center 32 of the ferrule 12 may be characterized by a radial distance $e_1$ and a reference angle $\alpha_1$. Thus, the center 36 of the micro-bore 14 may be positioned at $(e_1, \alpha_1)$ in cylindrical coordinates. The value e is referred to as the eccentricity and $\alpha$ is referred to as the bearing angle. The bore eccentricity is relative to the center 32 of the ferrule 12 and the bore bearing angle is relative to a reference axis, which may be the vertical axis (i.e., the positive y axis in FIG. 4). Other reference axes, however, may be possible.

Figure 5:
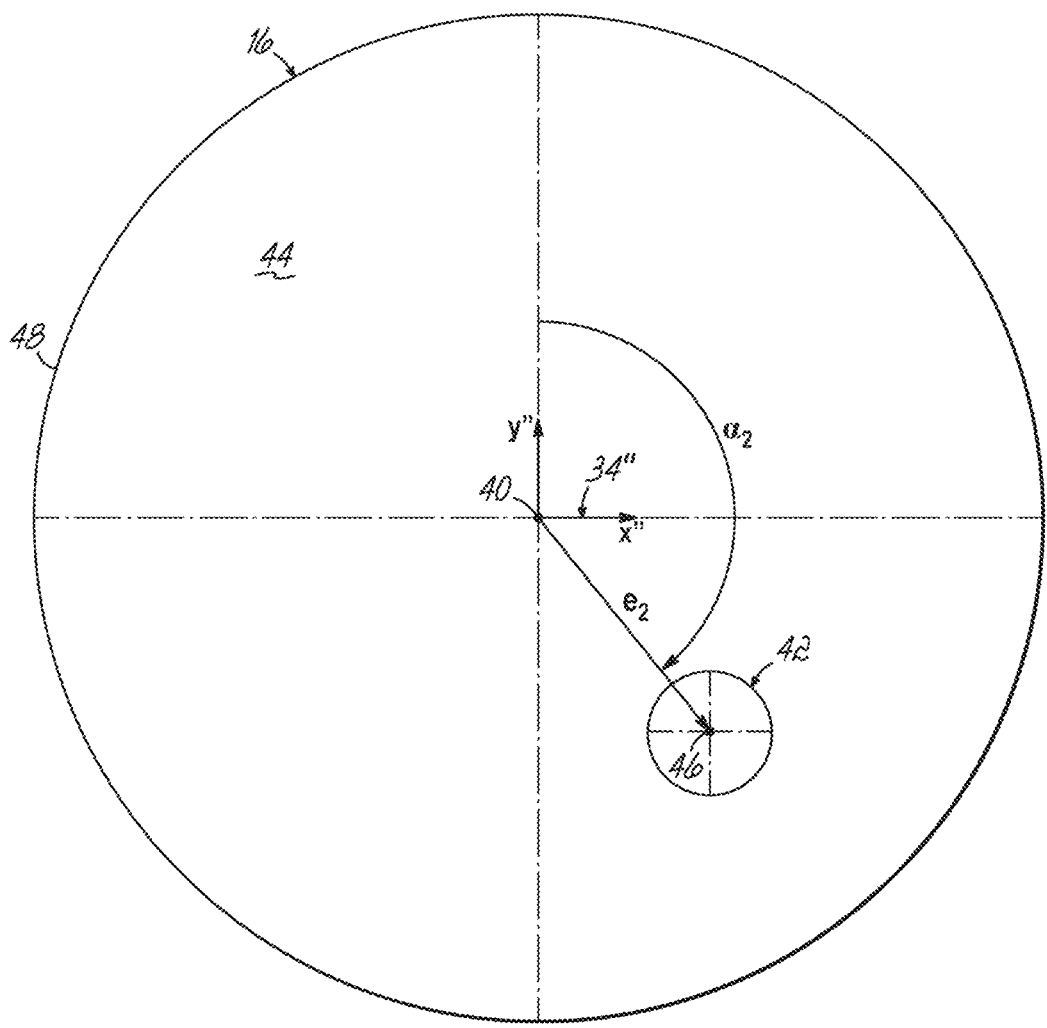
FIG. 5 is a schematic illustration of an end of an optical fiber showing a core offset.

In a similar manner, FIG. 5 is a schematic illustration of an optical fiber 16 having an off-center inner core 42. The optical fiber 16 includes an outer surface 48 that defines the center 40 of the optical fiber 16. The coordinate system 34" is shown having its origin at the center 40 of the optical fiber 16. The position of the core center 46 of the inner core 42 relative to the fiber center 40 may be characterized by eccentricity $e_2$ and bearing angle $\alpha_2$. Thus, the core center 46 of the inner core 42 may be positioned at $(e_2, \alpha_2)$ in cylindrical coordinates. The core eccentricity is relative to the center 40 of the optical fiber 16 and the core bearing angle is relative to a reference axis, which may be the vertical axis (i.e., the positive y" axis in FIG. 5).

Figure 6:
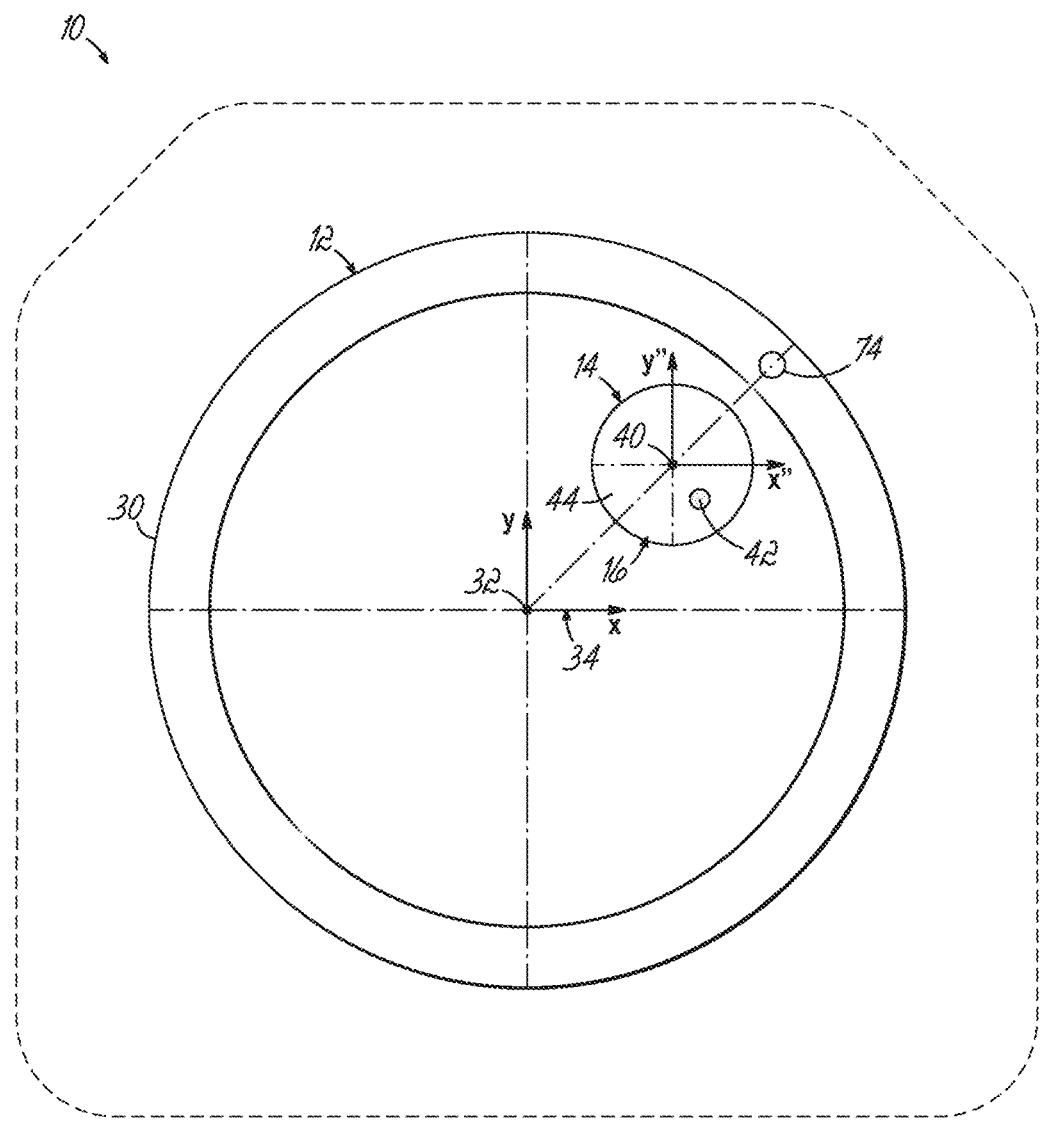
FIG. 6 is a schematic illustration of the end of the fiber optic connector with the optical fiber positioned in the micro-bore of the ferrule.

FIG. 6 illustrates the optical fiber 16 positioned within the micro-bore 14 with the ferrule 12 and the optical fiber 16 in the same orientation as provided in FIGS. 4 and 5, respectively, and ignoring any offset due to the position of the optical fiber 16 in the micro-bore 14. While the eccentricities of the micro-bore 14 and the inner core 42 relative to the ferrule center 32 and fiber center 40, respectively, are fixed for a given ferrule 12 and optical fiber 16 pair, the relative orientation of the ferrule 12 and the optical fiber 16 may be manipulated in order to minimize the core-to-ferrule offset. More particularly, if the bearing angles $\alpha_1$ and $\alpha_2$ are arranged 180 degrees apart and the inner core 42 is radially inboard of the fiber center 40, then the distance between the core center 46 and the ferrule center 32 will be minimized. This means that given a particular ferrule 12 and optical fiber 16 pair, the inner core 42 can be positioned as close as possible to the intended mating location of the ferrule 12 of fiber optic connector 10.

Figure 7:
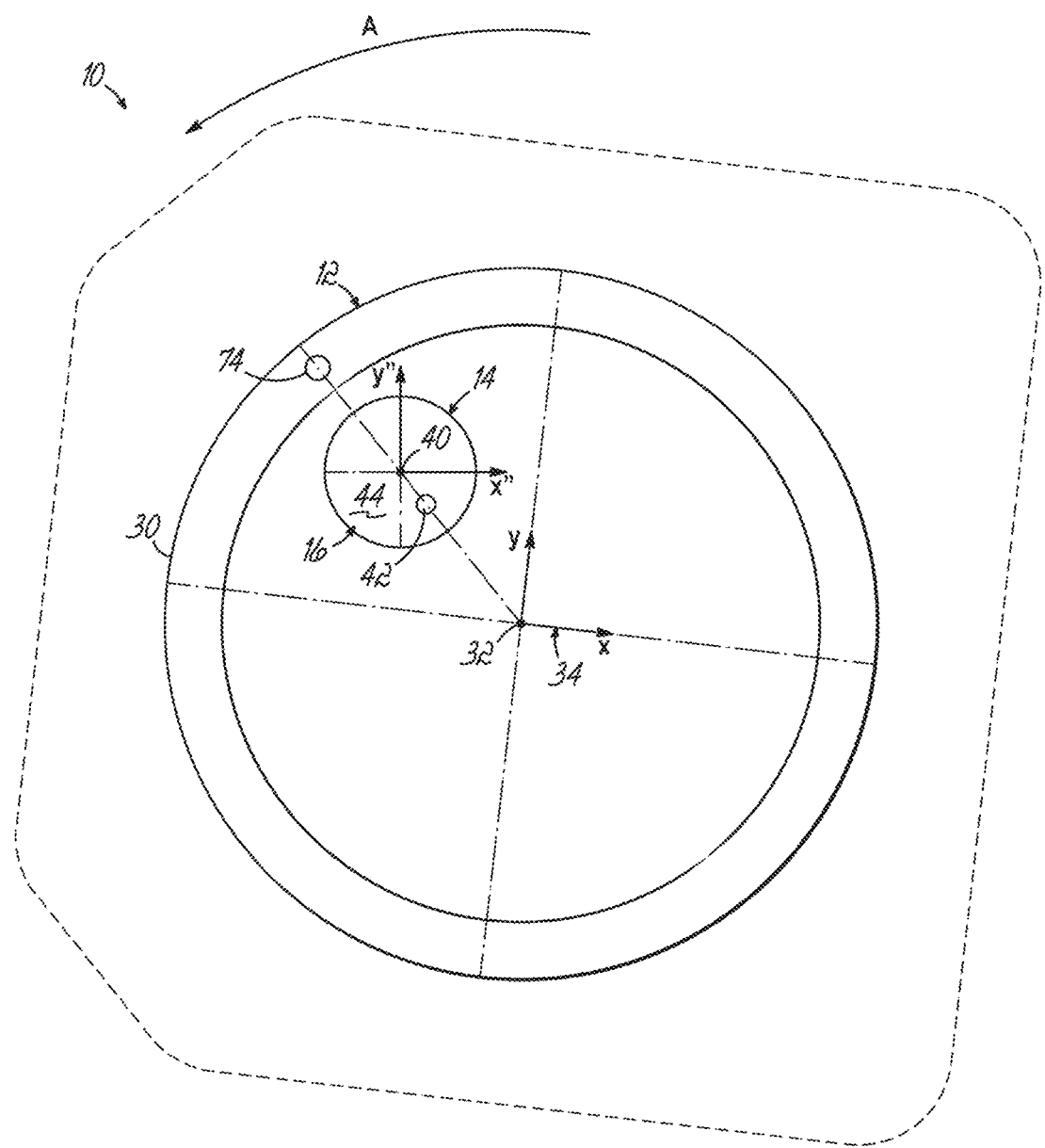
FIG. 7 is a schematic illustration of the fiber optic connector of FIG. 6 with the core-to-ferrule offset minimized by rotating the fiber optic connector (and thus the ferrule)
Figure 8:
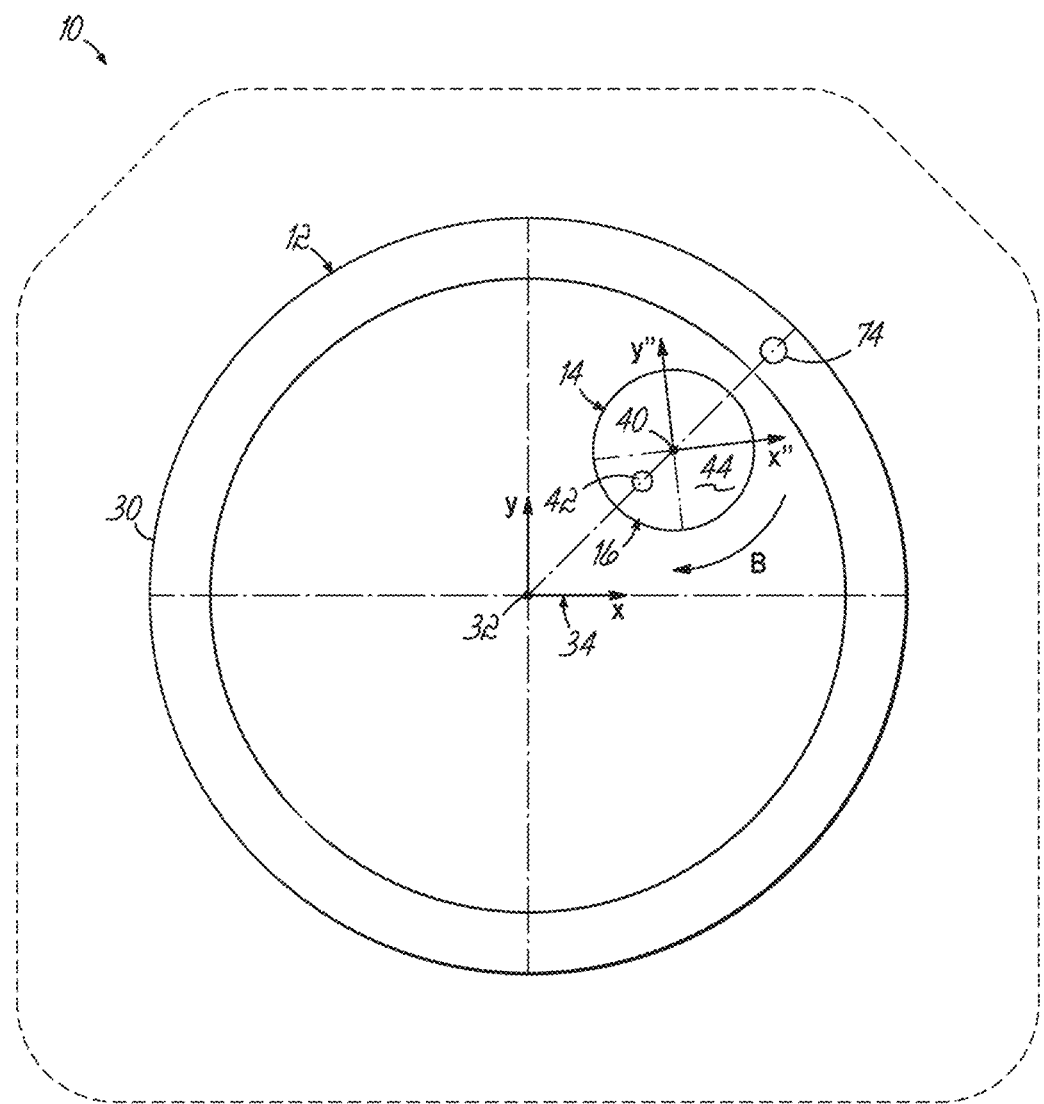
FIG. 8 is a schematic illustration of the fiber optic connector of FIG. 6 with the core-to-ferrule offset minimized by rotating the optical fiber.

FIG. 7 illustrates the optical fiber 16 positioned within the micro-bore 14 with the ferrule 12 and the optical fiber 16 having an orientation such that the bearing angles $\alpha_1$ and $\alpha_2$ are 180 degrees apart. The arrangement of FIG. 7 may be achieved by maintaining the orientation of the optical fiber 16 while the ferrule 12 (or alternatively the entire fiber optic connector 10) is rotated about its central axis to achieve a 180-degree difference in the bearing angles $\alpha_1$, $\alpha_2$ (demonstrated by arrow A). FIG. 8 is similar to FIG. 7 but where the orientation of the ferrule 12 is maintained and the optical fiber 16 is rotated to achieve a 180-degree difference in the bearing angles $\alpha_1$, $\alpha_2$ (demonstrated by arrow B). In a further alternative embodiment (not shown), both the ferrule 12 and the optical fiber 16 may be rotated to achieve the 180-degree difference in the bearing angles $\alpha_1$, $\alpha_2$. For example, in one exemplary embodiment, the ferrule 12 may be rotated such that micro-bore 14 is positioned upwardly from the ferrule center 32 (i.e., $\alpha_1$ is 0 degrees) and the optical fiber 16 may be rotated such that the inner core 42 is positioned downwardly from the fiber center 40 (i.e., $\alpha_2$ is 180 degrees). In a further embodiment, the ferrule 12 may be rotated before it is installed into the fiber optic connector such that micro-bore 14 is positioned upwardly (or other preferred direction with respect to an orientation key on the fiber optic connector) and the optical fiber 16 may be rotated such that the inner core 42 is positioned opposite to the direction of the micro-bore 14. As described more fully below, the relative rotations between the optical fiber 16 and the ferrule 12 in order to achieve the 180-degree difference in the bearing angles $\alpha_1$, $\alpha_2$ may be prior to the insertion of the optical fiber 16 in the micro-bore 14 of the ferrule 12.

The method outlined above takes into account the offset in the position of the micro-bore 14 within the ferrule 12 and the offset of the inner core 42 within the optical fiber 16 to minimize the core-to-ferrule offset. Thus, the inner core 42 is positioned as close as possible to the intended mating location of the ferrule 12 (and fiber optic connector 10) given a particular ferrule 12 and optical fiber 16 pairing. In other words, the inner core 42 is positioned as close as possible to the fixed, known location where the fiber optic connector 10 is expected to connect to another optical component. Thus, it is believed that the insertion losses associated with the optical connection between the fiber optic connector 10 as modified by the present disclosure and the other optical component will be reduced. That is, if the optical component to which the fiber optic connector 10 is configured to mate has also been "optimized" in the manner described above, then it is believed that a further reduction in the insertion losses across the optical connection will be achieved. For example, if the other optical component is another optical connector similar to fiber optic connector 10, then the core-to-ferrule offset for the other fiber optic connector may be similarly minimized. Thus, for each of the fiber optic connectors being mated across the optical connection, the inner cores 42 are as close as possible to their intended mating location and the insertion losses across the optical connection will be reduced, and perhaps significantly reduced, compared to current fiber optic connectors (made according to conventional manufacturing techniques) and randomly mated across an optical connection.

In a further aspect of the present disclosure, the variance as a result of the position of the optical fiber 16 within the micro-bore 14 (i.e., numeral ii) listed above and identified by $\Delta x_2$, $\Delta y_2$ (FIG. 3A)) may be reduced or eliminated. It is believed that reducing or eliminating this variance will further reduce the insertion losses across an optical connection. More particularly, one aspect of the method may include providing an interference fit between the optical fiber 16 and the micro-bore 14. Such an interference fit essentially eliminates any play that might exist in positioning the optical fiber 16 within the micro-bore 14 and any potential offsets as a result of that play. In the description above, the micro-bore 14 was sized just slightly larger than the optical fiber 16 to provide a clearance fit and a bonding agent 38 was used to secure the optical fiber 16 within the micro-bore 14. In an exemplary embodiment, the size of the optical fiber 16 may be sized to be the same or just slightly larger than the micro-bore 14 such that in the normal course, the optical fiber 16 is not able to fit into the micro-bore 14 at room temperature. For example, in one embodiment the optical fiber 16 may be between less than about 1% larger than the size of the micro-bore 14 in the ferrule 12, and preferably less than about 0.5% larger than the size of the micro-bore 14 in the ferrule 12 at room temperature. In one embodiment, for example, the diameter of the optical fiber 16 may be less than 0.5 microns (e.g., about 0.4 microns) larger than the diameter of the micro-bore 14 at room temperature.

To provide the interference fit, the ferrule 12 may be heated to a processing temperature above room temperature. Due to the thermal expansion of the ferrule material, the size of the micro-bore 14 in the ferrule 12 correspondingly increases. By way of example, the micro-bore 14 may be configured to expand no greater than about 1%, and more likely no greater than about 0.5% as a result of the heating. In one embodiment, the micro-bore 14 may expand no greater than about 0.5 microns as a result of the heating. For example and without limitation, for a typical ferrule (e.g., Y2O3-stabilized zirconia) having a micro-bore of 125 microns at room temperature, the micro-bore may expand about 0.43 microns when heated to about 350° C. and about 0.5 microns when heated to about 400° C. More particularly, the micro-bore 14 is configured to expand to a size that is substantially equal to or just slightly larger than the optical fiber 16 such that the optical fiber 16 may be inserted within the micro-bore 14 when the ferrule 12 is in a heated state. Subsequent to positioning the optical fiber 16 within the micro-bore 14, the ferrule 12 may be cooled, causing the ferrule material to thermally contract. As the ferrule material contracts, the size of the micro-bore 14 correspondingly decreases to engage against the outer surface 48 of the optical fiber 16 and thereby form an interference fit between the optical fiber 16 and the micro-bore 14 of the ferrule 12. By creating an interference fit, any offsets resulting from the placement/movement of the optical fiber 16 in the micro-bore 14 may be effectively eliminated and the insertion losses across an optical connection may be further reduced.

Figure 9:
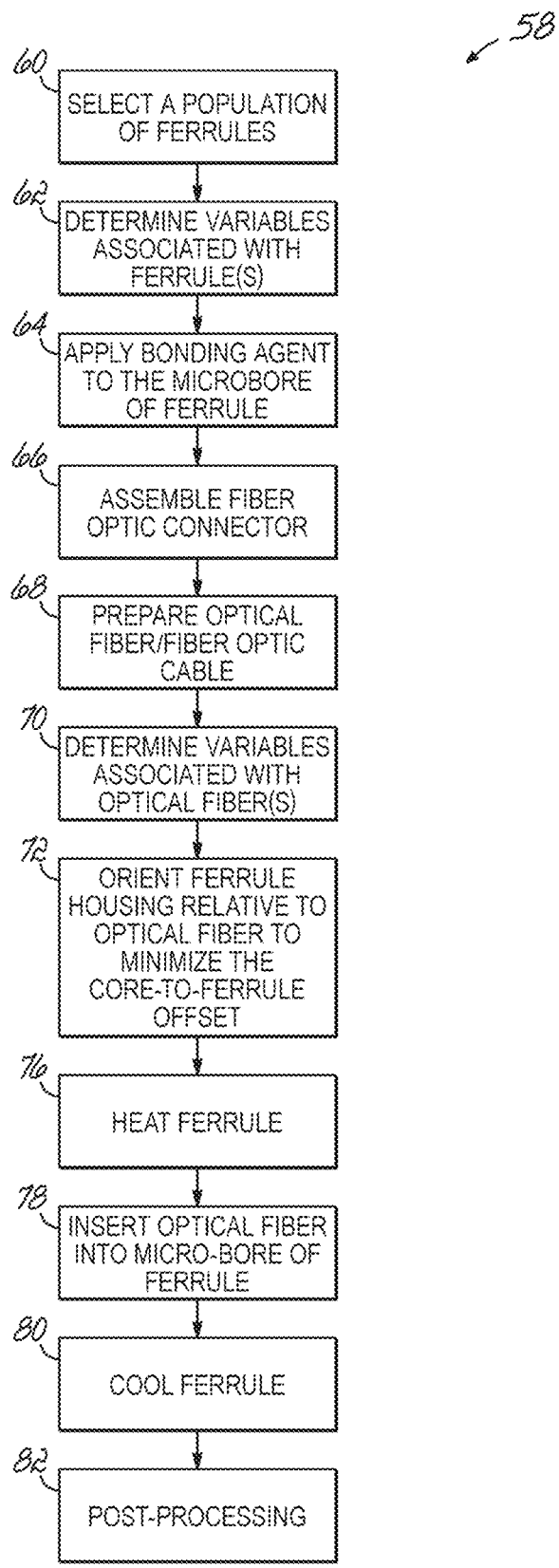
FIG. 9 is a flow chart of an exemplary method for minimizing the core-to-ferrule offset in accordance with an embodiment of the present disclosure.

FIG. 9 is a flow chart outlining a method 58 for forming a population $P_t$ of optical fibers 16 terminated with fiber optic connectors, such as fiber optic connectors 10, in accordance with aspects of the present disclosure. In an initial step 60, a population $P_f$ of ferrules 12 may be provided or selected from a greater group of ferrules 12. Certain data about the ferrules 12 may then be determined by measurement and/or calculation. In this regard, in a next step 62 of the method 58, the micro-bore diameter $D_1$, eccentricity $e_1$, and bearing angle $\alpha_1$ may be determined for each of the ferrules 12 in the population $P_f$. By way of example, these variables may be measured using generally known techniques available to those of ordinary skill in the art. Accordingly, a further description of these measurements will not be provided herein. The data about the ferrules 12 may be summarized as a mean micro-bore diameter $\mu_1$ and standard deviation $\sigma_1$. The eccentricity $e_1$ of the micro-bore 14 may be summarized with a standard deviation $b_1$.

In a next step 64 of method 58, the micro-bore 14 may be filled with a suitable bonding agent 38 for retaining the optical fiber 16 within the micro-bore 14. In one embodiment, the bonding agent 38 may have a composition including a partially cross-linked resin that is a polymer and a coupling agent that chemically bonds the partially cross-linked resin to the optical fiber 16 and the ferrule 12. In one embodiment, the melting point of the bonding agent may be at least 250° C., and more preferably at least 300° C. In an exemplary embodiment, the viscosity of the bonding agent 38 is preferably less than 700 Pa s, more preferably less than 500 Pa s, and even more preferably less than 300 Pa s at the heated temperature of the ferrule 12. By way of example, the bonding agent 38 may include polyphenylene sulfide (PPS). Other bonding agents, such as those disclosed in U.S. Pat. Nos. 8,696,215 and 9,568,686 (which are incorporated by reference herein in their entireties) may also be used.

In a further step 66 of method 58, the fiber optic connector 10 may be assembled. In one embodiment, the fiber optic connector 10 may be assembled but for the optical fiber 16 being coupled thereto (as well as some possible finishing steps, such as crimping, etc.). Thus, the ferrule 12 may be coupled to the ferrule holder 18, such as through an over-molding process or by press fitting, and then that assembly may be positioned within the housing 20. The assembly of the fiber optic connector 10 is generally well known in the industry and a further description will not be provided herein.

In another step 68 of method 58, the optical fiber 16 may be prepared for insertion into the ferrule 12. In one embodiment, for example, the optical fiber 16 may be carried by a fiber optic cable (not shown) that includes a plurality of optical fibers 16. The outer jacket of the fiber optic cable may be stripped to expose one or more optical fibers 16 carried by the fiber optic cable. If the optical fibers 16 are jacketed, then those jackets may be stripped to expose the bare optical fiber 16, which as noted above includes the inner core 42 and the outer cladding 44. Various stripping devices are known in the industry for stripping the outer jackets from optical fibers and/or fiber optic cables to thereby expose one or more bare optical fibers 16. Accordingly, a further description of this process will not be provided herein.

Certain data about the optical fiber 16 may then be determined by measurement and/or calculation. More particularly, in a next step 70, the fiber diameter $D_2$, eccentricity $e_2$, and bearing angle $\alpha_2$ may be determined for the optical fiber 16. By way of example, these variables may be measured using generally known techniques known to those of ordinary skill in the art. The data about the optical fibers 16 may be summarized as a mean diameter $\mu_2$ and standard deviation $\sigma_2$. The eccentricity $e_2$ of the inner core 42 may be summarized with a standard deviation $b_2$.

In a subsequent step 72 of method 58, the ferrule 12, and in particular the fiber optic connector 10, may be oriented relative to the optical fiber 16 so as to minimize the core-to-ferrule offset, i.e., the distance between the core center 46 of the inner core 42 and the center 32 of the ferrule 12, which operates as the mating location in the described embodiment. As noted above, one way to achieve the desired orientation is to maintain the orientation of the optical fiber 16 and rotate the fiber optic connector 10, and more particularly the ferrule 12, until the bearing angles $\alpha_1$, $\alpha_2$ are 180 degrees apart. In an exemplary embodiment, for example, this may be practiced by placing a marker 74 (FIGS. 6-8) on the ferrule end face adjacent an outer periphery of the end face and which lies on a radial line from the ferrule center 32 and through the bore center 36. The marker 74 provides an indication as to the eccentricity in the micro-bore 14 relative to the ferrule center 32. The fiber optic connector 10 may then be rotated until the marker 74 and the core center 46 of the inner core 42 lie on a line that is through the ferrule center 32. There are two possible positions of the fiber optic connector 10 relative to the optical fiber 16 for which such an alignment exists. The one that minimizes the core-to-ferrule offset is the one where the marker 74 and the inner core 42 are on opposite sides of the fiber center 40. In other words, the marker 74 should be positioned radially outboard of the fiber center 40, and the inner core 42 (and the core center 46) should be positioned radially inbound of the fiber center 40. The marker 74 may be any indicia (e.g., a dot, arrow, dash, etc.) that indicates the direction of the bore eccentricity. Moreover, the marker 74 may be placed in the end face of the ferrule 12 using any suitable technique, such as by laser etching. Other methods may also be possible.

In an alternative embodiment, a similar process may be used, but the fiber optic connector 10 may be held in position while the optical fiber 16 is rotated about its central axis until the marker 74 and the core center 46 lie on a line that is through the ferrule center 32 and are on opposite sides of the fiber center 40 similar to that described above. In still a further embodiment, the fiber optic connector 10 may be rotated until the marker 74 lies along a vertical line in an upwardly position relative to ferrule center 32, and the optical fiber 16 may be rotated until the inner core 42 lies along the vertical line in a downwardly position relative to the fiber center 40. In yet another embodiment, the ferrule 12 may be rotated before being installed into the fiber optic connector 10 such that the marker 74 points upwardly (or other preferred direction with respect to an orientation key on the fiber optic connector) and the optical fiber 16 may be rotated such that the inner core 42 is positioned opposite to the direction of the micro-bore 14. Those of ordinary skill in the art may recognize other methods of orienting the ferrule 12 and optical fiber 16 such that the bearing angles $\alpha_2$ are 180 degrees apart. These remain within the scope of the present disclosure.

In a next step 76 of method 58, the ferrule 12 may be heated to a processing temperature $T_1$ above room temperature. The processing temperature $T_1$ should be sufficiently high to melt the bonding agent 38 within the micro-bore 14 of the ferrule 12 and to expand the size of the micro-bore 14 due to the thermal expansion of the ferrule material. In one embodiment, the ferrule 12 may be heated to a processing temperature $T_1$ of greater than about 300° C., preferably greater than about 350° C., and more preferably greater than about 400° C. The manner in which the ferrule 12 is heated to the processing temperature $T_1$ is generally known in the art and thus will not be discussed in any further detail herein.

In a next step 78 of method 58, the optical fiber 16 may be inserted into the micro-bore 14 of the ferrule 12 until the optical fiber 16 slightly extends from the end face of the ferrule 12. Methods for inserting the optical fiber 16 within the micro-bore 14 are generally known in the art and thus will not be more fully described herein. In one embodiment, however, the feed rate $V_1$ of the optical fiber 16 within the micro-bore 14 may be less than about 10 millimeters per second (mm/s), and more preferably less than about 5 mm/s. In yet a further step 80, with the optical fiber 16 positioned in the micro-bore 14, the ferrule 12 may be cooled. For example, the ferrule 12 may be air cooled, such as by natural convection and/or by forced convection. Alternatively, liquid cooling may also be used. By way of example and without limitation, the ferrule 12 may be subjected to forced cooling for a first period of time, natural cooling for a second period of time, and then forced cooling for a third period of time. As the ferrule 12 cools, the ferrule material contracts about the optical fiber 16 to create an interference fit between the optical fiber 16 and the micro-bore 14 of the ferrule 12 to thereby secure the optical fiber 16 to the ferrule 12 and fiber optic connector 10. An interference fit provides an improved connection between the optical fiber 16 and the fiber optic connector 10. For example, in standard tests, the fiber optic connector 10 may have a pull-out force larger than about 5 pounds (lbs) for pre-aged connectors and a pull-out force of larger than about 3 lbs for post-aged connectors. Moreover, in standard fiber movement tests, the fiber optic connector 10 has a fiber movement of less than about 30 mm, preferably less than about 20 mm, and even more preferably less than about 10 mm.

In a further step 82 of method 58, any post processing steps on the fiber optic connector 10 may be performed. For example, various crimping and cleaving processes may be performed on the fiber optic connector 10 to ensure a secure connection between the optical fiber or fiber optic cable and the fiber optic connector 10. Additionally, various polishing processes may be performed to ensure the end face of the ferrule 12 is properly shaped and free of debris or other defects that might degrade the optical signal across the optical connection. The post-processing steps are generally known to those of ordinary skill in the art and thus a further description will not be provided herein.

It is within the scope of the present disclosure that the steps illustrated in FIG. 9 and described above may be repeated as needed to terminate a desired number of optical fibers 16 with fiber optic connectors 10. In the end, one has a population $P_t$ of optical fibers 16 terminated with fiber optic connectors 10 wherein the position of the inner cores 42 of the optical fibers 16 are located very near to the intended mating location of the fiber optic connector 10. When fiber optic connectors 10 made in accordance with method 58 described above are mated together at an optical connection, such as in an adapter, it is believed that the insertion loss across the optical connection will be reduced as compared to current levels. For example, current insertion losses across an optical connection with mated connectors typically have a Grade B rating as defined by the IEC Standard IEC61300-3-34. For a Grade B rating, a random mating of a number of samples S must have insertion loss (IL) values as follows: $IL_{mean} \leq 0.12$ dB and $IL_{max} \leq 0.25$ dB for greater than 97% of the samples S. In one embodiment, the methods disclosed herein result in fiber optic connectors with improved insertion loss performance as compared to the Grade B rating. In another embodiment, fiber optic connectors of the present disclosure have insertion loss (IL) values as follows: $IL_{mean} \leq 0.07$ dB and $IL_{max} \leq 0.15$ dB for greater than 97% of the samples S. And achieving the improved insertion loss performance may for the most part be achieved using existing parts, materials and manufacturing processes. Thus, the reduction in insertion losses is gained with minimal cost and disruption to current production facilities.

Method 58 describes forming an interference fit between the optical fiber 16 and the micro-bore 14 as a result of inserting the optical fiber 16 into the micro-bore 14 while the ferrule 12 is in a heated state and then cooling the ferrule 12 such that as the ferrule material contracts, the ferrule micro-bore 14 engages with the outer surface of the optical fiber 16. While forming an interference fit is desirable for reducing insertion losses, forming such an interference fit may prove challenging in practice, especially given the variations in the diameters $D_1$ and $D_2$ of the micro-bores 14 and optical fibers 16, respectively, across a population $P_f$ of the ferrules 12 and a population $P_o$ of optical fibers 16 made with current materials and manufacturing techniques.

In current fiber optic connectors, the diameter of the micro-bore 14 in the ferrule 12 is chosen to be sufficiently high relative to the diameter of the optical fiber 16 such that the optical fiber 16 will fit within the micro-bore 14 for every ferrule 12 and optical fiber 16 in the populations $P_f$, $P_o$ of ferrules 12 and optical fibers 16, respectively. In other words, the diameter of the micro-bore 14 is sufficiently large that $D_1 - D_2 > 0$ for 100% of the ferrule and fiber populations $P_f$, $P_o$. This scenario, however, provides for no interference fit between the optical fiber 16 and the ferrule 12 and thus can generate increased insertion losses for the fiber optic connector across an optical connection. If the mean diameter $\mu_1$ of the micro-bore 14 is designed to be the same as the mean diameter $\mu_2$ of the optical fiber 16 (e.g., 125 microns), then given a typical distribution of bore and fiber diameters about these mean values and standard deviations at room temperature, one would expect the optical fiber 16 to fit within the micro-bore 14 for about 50% of the time. For the other 50% of the time, the optical fiber 16 would not fit within the micro-bore 14, and the ferrule 12 would have to be scrapped (as opposed to the optical fiber, since the optical fiber may be part of a more expensive fiber optic cable). As such, a significant amount of scrap would be generated resulting in a cost prohibitive and inefficient production process.

As discussed above, by heating the ferrule 12, the diameter of the micro-bore 14 increases. For example, heating the ferrule 12 to a processing temperature $T_1$ of between about 300° C. and about 400° C. will increase the micro-bore diameter by no more than about 1%, and more likely by no more than about 0.5%. For example, for a micro-bore 14 having a diameter of $D_1 = 125$ microns, the micro-bore diameter $D_1$ may increase by about 0.5 microns when the ferrule 12 is heated to a processing temperature $T_1$ of about 400° C. When the ferrule 12 is heated, the number of optical fibers 16 (having a mean diameter of 125 microns) that will fit within the micro-bores 14 when the ferrule 12 is at the elevated temperature $T_1$ will be greater than that at room temperature. For example, given a typical distribution of bore and fiber diameters, it is expected that less than about 1% of the optical fibers 16 would not fit within the micro-bores 14 when the micro-bores have been expanded by no more than about 1%. Thus, the amount of scrap ferrules 12 may be significantly reduced by heating the ferrule 12 during insertion of the optical fiber 16 therein. Moreover, it should be recognized that while a significant number of connections between the ferrule 12 and the optical fiber 16 may form an interference fit as a result of the heating step, not all of the connections from the populations $P_f$ and $P_o$ will make an interference fit. For these connections, there is a clearance fit and the bonding agent 38 will retain the optical fiber 16 within the micro-bore 14 of the ferrule 12. In the above, the mean diameter $\mu_1$ of the micro-bore 14 of the ferrule 12 was selected to be equal to the mean diameter $\mu_2$ of the optical fiber 16. If, however, the mean diameter $\mu_2$ of the optical fiber 16 is configured to be just slightly greater than the mean diameter $\mu_1$ of the micro-bore 14, then the probability of an interference fit being formed between the micro-bore 14 of the ferrule 12 and the optical fiber 16 increases when using the heating and cooling techniques described above.

In one embodiment, the mean diameter $\mu_2$ of the optical fiber 16 may be selected to be larger than the mean diameter $\mu_1$ of the micro-bore 14 of the ferrules. However, the difference in the two mean diameters $\mu_2 - \mu_1$ may be configured to meet a pre-determined criterion in order to achieve as many interference fits between the optical fibers 16 and the ferrules 12 without an excessive number of scrapped ferrules 12 due to the inability to fit within the micro-bores 14. By way of example, in one embodiment, for a given population $P_t$ of terminated optical fibers with connectors in accordance with the method described above, the mean diameters $\mu_1$, $\mu_2$ of the micro-bores 14 of the ferrules 12 and the optical fibers 16, respectively, may be selected so that $0 \leq D_2 - D_1 \leq 0.4$ μm for at least 25% of the population $P_t$. In an alternative embodiment, the mean diameters $\mu_1$, $\mu_2$ of the micro-bores 14 of the ferrules 12 and the optical fibers 16, respectively, may be selected so that $0 \leq D_2 - D_1 \leq 0.4$ μm, for at least 50% of the population $P_t$. In another alternative embodiment, the mean diameters $\mu_1$, $\mu_2$ of the micro-bores 14 of the ferrules 12 and the optical fibers 16, respectively, may be selected so that $0 \leq D_2 - D_1 \leq 0.4$ μm, for at least 75% of the population $P_t$. In still a further alternative embodiment, the mean diameters $\mu_1$, $\mu_2$ of the micro-bores 14 of the ferrules 12 and the optical fibers 16, respectively, may be selected so that $0 \leq D_2 - D_1 \leq 0.4$ μm, for at least 90% of the population $P_t$. In these various embodiments, the number of optical fibers 16 that form an interference fit with the ferrules 12 is sufficiently high such that the number of scrapped ferrules 12 is sufficiently low and the insertion losses across an optical connection are reduced.

As a way to capture acceptable variances in the populations of the ferrules $P_f$ and optical fibers $P_o$ that ultimately result in terminated optical fibers formed by the populations that are expected to have improved insertion losses across an optical connection, one may resort to statistical analyses. In accordance with another aspect of the present disclosure, before optical fibers 16 are connected to a respective ferrule 12 of a fiber optic connector 10, the determining steps 62, 70 for the two populations $P_f$, $P_o$ may be performed. The data may then be analyzed statistically by determining the mean $\mu_1$, $\mu_2$ and standard deviation $\sigma_1$, $\sigma_2$ for the ferrule 12 and optical fiber 16 populations $P_f$, $P_o$, respectively. Moreover, the standard deviation $b_1$, $b_2$ for the eccentricity $e_1$, $e_2$ for the ferrule micro-bore 14 and inner core 42 locations for populations $P_f$, $P_o$, respectively, may also be analyzed. If the statistical data is "close enough" to each other, then the method may continue by connecting the optical fibers 16 to respective ferrules 12 of fiber optic connectors 10 as described in FIG. 9 above. If the statistical data does not match sufficiently closely to each other, then the process may not move forward and another ferrule population $P_f$ may be selected, for example. In an exemplary embodiment, the statistical data may be deemed close enough to each other if the statistical factors are within a specified range of each other. In one embodiment, for example, the ferrule population $P_f$ and the optical fiber population $P_o$, may be acceptable when the statistical data falls into one or more, and preferably each, of the following ranges:

$$0 \le \mu_2 - \mu_1 \le 0.4 \mu m; \tag{1}$$

$$0.75 \le \frac{\sigma_2}{\sigma_1} \le 2.5; \text{ and} \tag{2}$$

$$0.8 \le \frac{b_2}{b_1} \le 1.5 \tag{3}$$

From a practical standpoint, if the current manufacturing techniques are to be retained, the only variable that might be controllable is the diameter $D_1$ of the micro-bores 14 in the ferrules 12. Thus, this variable may be manipulated in order to bring the ferrule population $P_f$ within the constraints to produce connectors with improved insertion losses.

In yet another aspect of the present disclosure, a further reduction in the insertion loss across an optical connection of two mated connectors may be achieved by some level of selective matching between ferrule 12 and optical fiber 16 used to form the fiber optic connector 10. Thus, in a further aspect of the method described above, for the population $P_f$ of ferrules 12 and the population $P_o$ of optical fibers 16, the respective variables associated with the ferrules 12 and optical fibers 16 may be determined prior to other steps associated with coupling a select one of the optical fibers 16 to a select one of the ferrules 12. In other words, for the ferrules 12 and optical fibers 16 in the populations $P_f$ and $P_o$, respectively, steps 62 and 70 may be performed prior to the orienting step 72, heating step 76, insertion step 78, and the coupling step 80. Thus, the eccentricity e for each of the ferrules 12 and optical fibers 16 in their respective populations $P_f$ and $P_o$ are known prior to the optical fibers 16 being coupled to the ferrules 12.

As noted above, the eccentricity is indicative of a radial offset, i.e., a radial distance from a reference point. Theoretically, if the eccentricity $e_1$ of the micro-bore and the eccentricity $e_2$ of the inner core are substantially equal (and ignoring any offset due to the position of the optical fiber 16 within the bore, as noted by point ii) above), then the core center 46 should be located at the ferrule center 32 and the core-to-center offset should be substantially zero. This means that the core center 46 is substantially exactly located at the mating location for the ferrule 12 and fiber optic connector 10. This demonstrates that further improvements in insertion loss reduction may be achieved if there is selective matching between eccentricities $e_1$ and $e_2$ of the micro-bores 14 of the ferrules 12 and optical fibers 16.

Figure 10:
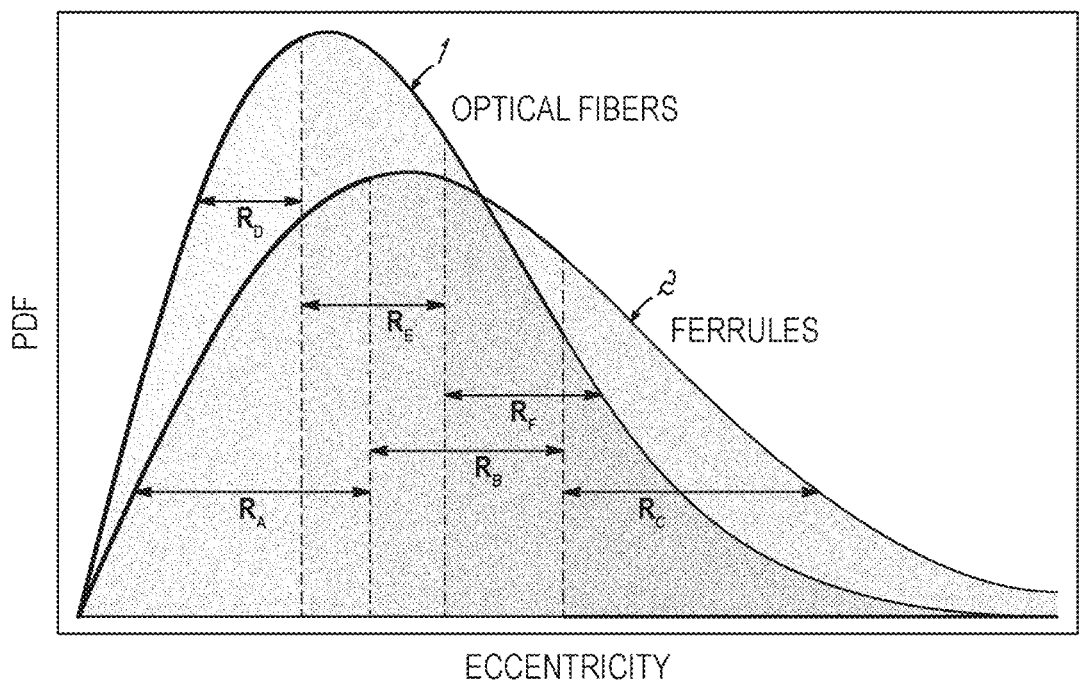
FIG. 10 is a graph illustrating ferrule and optical fiber distributions and separating the ferrules and optical fibers into groups.
Figure 11:
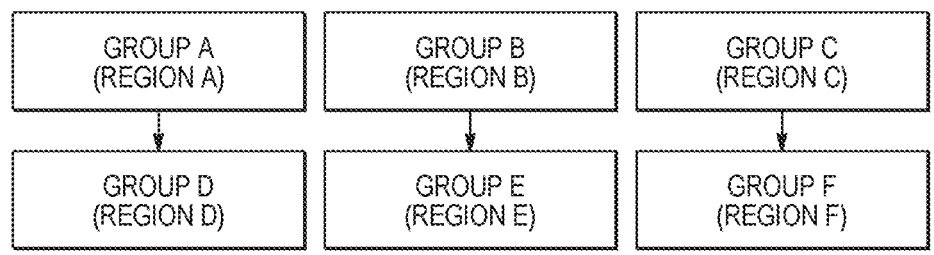
FIG. 11 is a schematic illustration of a method of selectively matching ferrules and optical fibers from respective groups illustrated in FIG. 10.

FIGS. 10 and 11 are schematic illustrations of a method for selectively matching the ferrules 12 and the optical fibers 16 in accordance with an embodiment of the present disclosure. In the figure, curve 1 represents a distribution of eccentricities $e_1$ associated with the micro-bores 14 of the ferrules 12, and curve 2 represents a distribution of eccentricities $e_2$ associated with the inner cores 42 of the optical fibers 16. In this embodiment, each of the distributions 1, 2 may be divided into a plurality of regions. By way of example, each of the distributions 1, 2 may be divided into three regions, however fewer or more regions may be used. In this regard, the distribution 1 for the micro-bore 14 eccentricities $e_1$ may be divided into three regions $R_A$, $R_B$, and $R_C$. The first region $R_A$ may have a range between zero and a pre-determined value $R_a$, $0 \le R_A \le R_a$. The second region $R_B$ may have a range between $R_a$ and $R_b$, $R_a \le R_B \le R_b$, where $R_b$ is also a pre-determined value. Lastly, the third region $R_C$ may have a range greater than $R_b$, $R_C > R_b$. By way of example, the values $R_a$ and $R_b$ may be determined by equally dividing the distribution 1 approximately into thirds based on total area under the curve, for example. Other ways for determining the values of $R_a$ and $R_b$ may also be used.

In a similar manner, the distribution 2 for the inner core 42 eccentricities $e_2$ may be divided into three regions $R_D$, $R_E$, and $R_F$. The first region $R_D$ may have a range between zero and a pre-determined value $R_d$, $0 \le R_D \le R_d$. The second region $R_E$ may have a range between $R_d$ and $R_e$, $R_d < R_D \le R_e$ where $R_e$ is also a pre-determined value. Lastly, the third region $R_F$ may have a range greater than $R_e$, $R_F > R_e$. By way of example, the values $R_d$ and $R_e$ may be determined by equally dividing the distribution 2 approximately into thirds based on total area under the curve, for example. Other ways for determining the values of $R_d$ and $R_e$ may also be used.

In accordance with the method 58, when selecting the ferrule 12 and optical fiber 16 to pair when making the fiber optic connector 10, the ferrules 12 and optical fibers 16 may be selected from corresponding regions. Thus, for example, and as illustrated in FIG. 11, ferrules 12 that fall into $R_A$ may be matched with optical fibers 16 that fall into $R_D$; ferrules 12 that fall into $R_B$ may be matched with optical fibers 16 that fall into $R_E$; and ferrules 12 that fall into $R_C$ may be matched with optical fibers 16 that fall into $R_F$. By selectively matching the eccentricities $e_1$ and $e_2$, the core center 46 will be located closer to the ferrule center 32 for the population of fiber optic connectors 10 as compared to fiber optic connectors that were produced by randomly mating the ferrules 12 and optical fibers 16 in the populations $P_f$ and $P_o$. Accordingly, a further reduction in insertion loss is expected across an optical connection formed by the fiber optic connectors produced from the selective matching process described above. Selective matching may be used for a population $P_f$ of ferrules 12 and a population $P_o$ of optical fibers 16 whether an interference fit and/or a clearance fit is intended between the ferrules 12 and the optical fibers 16.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The present disclosure in its broader aspects is therefore not limited to the specific details, representative apparatus and methods and illustrative examples shown and described. Accordingly, departures may be made from such details without departing from the scope of the present disclosure.

What is claimed is:

1. A population of fiber optic connectors formed from a population of ferrules and a population of optical fibers, wherein each fiber optic connector of the population of fiber optic connector comprises:
an optical fiber from the population of optical fibers, the optical fiber defining a fiber center and including an inner core; and
a ferrule from the population of ferrules, the ferrule including an end face and a micro-bore extending through the ferrule, the end face defining a mating location and a ferrule center, and the micro-bore defining a bore center,
wherein the optical fiber is oriented within the micro-bore such that the distance between the inner core and the mating location is at a minimum.

2. The population of fiber optic connectors of claim 1, wherein for each fiber optic connector of the population of fiber optic connectors:
the micro-bore is offset from the ferrule center to define a bore bearing angle at the end face relative to a reference axis of the ferrule,
the inner core is offset from the fiber center to define a core bearing angle at an end of the optical fiber relative to a reference axis of the optical fiber, and
the optical fiber is oriented within the at least one micro-bore such that the bore bearing angle of the bore offset and the core bearing angle of the core offset are 180 degrees apart.

3. The population of fiber optic connectors of claim 1, wherein for each fiber optic connector of the population of fiber optic connectors, the optical fiber is oriented within the micro-bore such that the ferrule center, the inner core, and the bore center lie along a common line.

4. The population of fiber optic connectors of claim 3, wherein the inner core is located between the ferrule center and the bore center.

5. The population of fiber optic connectors of claim 3, wherein the common line is a common radial line extending from the ferrule center.

6. The population of fiber optic connectors of claim 5, wherein:
the ferrule further comprises a marking on the end face, and
the optical fiber is oriented within the micro-bore such that the marking lies along the common radial line.

7. The population of fiber optic connectors of claim 1, wherein for each fiber optic connector of the population of fiber optic connectors:
the optical fiber is bonded to the micro-bore using a bonding agent that comprises a partially cross-linked polymer resin and a coupling agent that chemically bonds the partially cross-linked polymer resin to the optical fiber and the ferrule.

8. The population of fiber optic connectors of claim 7, wherein the melting point of the bonding agent is at least 250° C.

9. The population of fiber optic connectors of claim 1, wherein for each fiber optic connector of the population of fiber optic connectors, the mating location coincides with the ferrule center.

10. The population of fiber optic connectors of claim 1, wherein:
the population of ferrules has a mean diameter $\mu_1$ and a standard deviation $\sigma_1$,
the population of optical fibers has a mean diameter $\mu_2$ and a standard deviation $\sigma_2$, and
$0 \leq \mu_2 - \mu_1 \leq 0.4$ µm and/or $0.75 \leq \sigma_2/\sigma_1 \leq 2.5$.

11. The population of fiber optic connectors of claim 1, wherein:
each ferrule in the population of ferrules has a diameter $D_1$,
each optical fiber in the population of optical fibers has a diameter $D_2$, and
in a random sampling pairing the ferrules from the population of ferrules with respective optical fibers from the population of optical fibers, $0 \leq D_2 - D_1 \leq 0.4$ µm for at least 25% of the sampled population.

12. The population of fiber optic connectors of claim 11, wherein $0 \leq D_2 - D_1 \leq 0.4$ µm for at least 50% of the sampled population.

13. The population of fiber optic connectors of claim 11, wherein $0 \leq D_2 - D_1 \leq 0.4$ µm for at least 75% of the sampled population.

14. The population of fiber optic connectors of claim 11, wherein $0 \leq D_2 - D_1 \leq 0.4$ µm for at least 90% of the sampled population.

15. The population of fiber optic connectors of claim 1, wherein:
the inner core in each of the optical fibers in the population of optical fibers defines an eccentricity,
the micro-bore in each of the ferrules in the population of ferrules defines an eccentricity,
the population of optical fibers is separated into a number of fiber groups, each fiber group having a different range of eccentricities,
the population of optical fibers is separated into a number of ferrule groups, each ferrule group having a different range of eccentricities,
the number of fiber groups is equal to the number of ferrule groups so that the number of fiber groups and the number of ferrule groups may be ordered into corresponding pairs by eccentricity, and
for each fiber optic connector in the population of fiber optic connectors, the optical fiber and the ferrule are from a corresponding fiber group and ferrule group pair.

16. The population of fiber optic connectors of claim 15, wherein the number of fiber groups and the number of ferrule groups is two or three.

17. A population of fiber optic connectors formed from a population of ferrules and a population of optical fibers, wherein each fiber optic connector in the population of fiber optic connector is formed by a method comprising:
selecting a ferrule from the population of ferrules, the ferrule including an end face and a micro-bore extending through the ferrule, and the end face defining a mating location;
selecting an optical fiber from the population of optical fibers, the optical fiber including an inner core;
determining a bore bearing angle of a bore offset of the micro-bore in the ferrule at the end face relative to a reference axis of the ferrule;
determining a core bearing angle of a core offset of the inner core in the optical fiber at an end of the optical fiber relative to a reference axis of the optical fiber;
orienting the ferrule and the optical fiber relative to each other to minimize the distance between the inner core of the optical fiber and the mating location of the ferrule;

heating the ferrule to a processing temperature above room temperature; and with the ferrule at the processing temperature and with the distance between the inner core and the mating location minimized, coupling the optical fiber to the micro-bore of the ferrule.

18. The population of fiber optic connectors of claim 17, wherein orienting the ferrule and the optical fiber relative to each other to minimize the distance between the inner core and the mating location comprises orienting the ferrule and the optical fiber relative to each other so that the bore bearing angle of the bore offset and the core bearing angle of the core offset are 180 degrees apart.

19. The population of fiber optic connectors of claim 17, wherein the method further comprises:

marking the ferrule end face with an indicia along a radial line from a ferrule center of the ferrule through a bore center of the micro-bore, the indicia being positioned on the ferrule end face radially outboard of the micro-bore; and wherein orienting the ferrule and the optical fiber relative to each other to minimize the distance between the inner core and the mating location comprises orienting the ferrule and the optical fiber relative to each other such that the radial line extends through a center of the inner core and the indicia and the inner core are on opposite sides of a center of the optical fiber.

20. The population of fiber optic connectors of claim 17, wherein:

the population of ferrules has a mean diameter $\mu_1$ and a standard deviation $\sigma_1$, the population of optical fibers has a mean diameter $\mu_2$ and a standard deviation $\sigma_2$, and $0 \leq \mu_2 - \mu_1 \leq 0.4$ µm and/or $0.75 \leq \sigma_2/\sigma_1 \leq 2.5$.

21. The population of fiber optic connectors of claim 17, wherein:

each ferrule in the population of ferrules has a diameter $D_1$, each optical fiber in the population of optical fibers has a diameter $D_2$, and in a random sampling pairing the ferrules from the population of ferrules with respective optical fibers from the population of optical fibers, $0 \leq D_2 - D_1 \leq 0.4$ µm for at least 25% of the sampled population.

22. The population of fiber optic connectors of claim 21, wherein $0 \leq D_2 - D_1 \leq 0.4$ µm for at least 50% of the sampled population.

23. The population of fiber optic connectors of claim 21, wherein $0 \leq D_2 - D_1 \leq 0.4$ µm for at least 75% of the sampled population.

24. The population of fiber optic connectors of claim 21, wherein $0 \leq D_2 - D_1 \leq 0.4$ µm for at least 90% of the sampled population.

25. The population of fiber optic connectors of claim 17, wherein the method further comprises:

measuring an eccentricity of the micro-bore in each of the ferrules in the population;

measuring an eccentricity of the inner core in each of the optical fibers in the population;

separating the population of optical fibers into a plurality of fiber groups, each fiber group having a different range of eccentricities;

separating the population of ferrules into a number of ferrule groups, each ferrule group having a different range of eccentricities, wherein the number of fiber groups is equal to the number of ferrule groups;

ordering the fiber groups and the ferrule groups into corresponding pairs by eccentricity; and performing the orienting, heating and coupling steps using a selected ferrule and a selected optical fiber from a corresponding fiber group and ferrule group pair.

* * * * *

UNITED STATES PATENT AND TRADEMARK OFFICE
CERTIFICATE OF CORRECTION

| | | |
|---|---|---|
| PATENT NO. | : 11,822,129 B1 | |
| APPLICATION NO. | : 17/962697 | |
| DATED | : November 21, 2023 | |
| INVENTOR(S) | : Raisa Rose Boben et al. | |

It is certified that error appears in the above-identified patent and that said Letters Patent is hereby corrected as shown below:

On the Title Page

In Column 1, item (72), Inventors, Line 9, add "Mateusz Tomasz Zujewski, Jezewo, Poland (PL)".

Signed and Sealed this
Fifteenth Day of October, 2024

Katherine Kelly Vidal
*Director of the United States Patent and Trademark Office*